(No Model.)

J. MASLIN.
CHAIN GEARING.

No. 249,249.        Patented Nov. 8, 1881.

WITNESSES
A. B. Robertson
W. T. Robertson

INVENTOR
John Maslin
By T. J. W. Robertson
*Attorney*

UNITED STATES PATENT OFFICE.

JOHN MASLIN, OF JERSEY CITY, NEW JERSEY.

CHAIN GEARING.

SPECIFICATION forming part of Letters Patent No. 249,249, dated November 8, 1881.

Application filed September 29, 1881. (No model.)

*To all whom it may concern:*

Be it known that I, JOHN MASLIN, a citizen of the United States, residing at Jersey City, in the county of Hudson and State of New Jersey, have invented certain new and useful Improvements in Chain Gearing, of which the following is a specification, reference being had therein to the accompanying drawings.

This invention relates to that class of machines in which an endless chain is used to give motion to a chain or cable for shoveling, hoisting, grading, conveying, or other machinery; and it consists in the peculiar construction and combination and operation of the various parts, as more fully hereinafter described and claimed.

Figure 1:
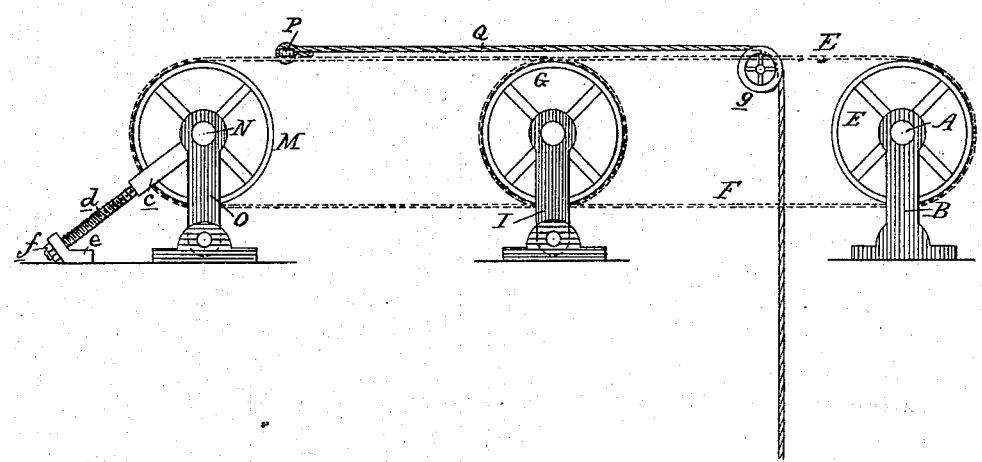
Figure 2:
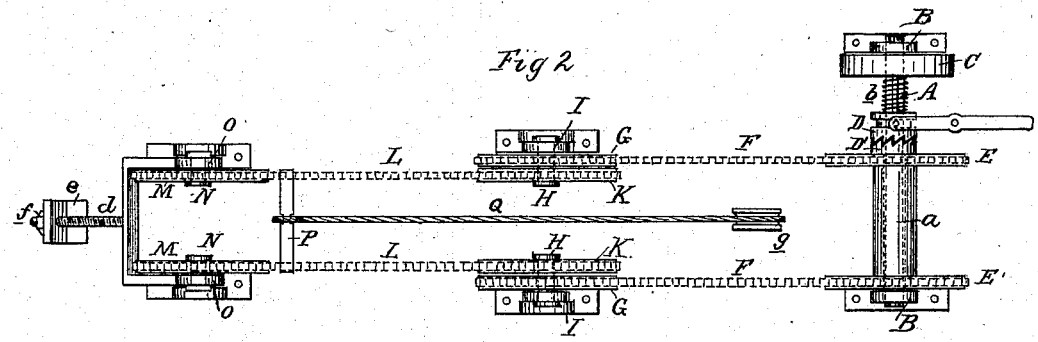
Figure 3:

In the drawings, Figure 1 represents a side view of my invention; Fig. 2, a plan view of the same; Fig. 3, an enlarged detail, showing the form of chain-link used.

A represents the driving-shaft, journaled in fixed bearings B, and provided with a belt-pulley, C, and a ratchet-clutch, D, fitted to slide in the shaft, but turning with it. This shaft also carries the wheels E E', which are so fitted that they may turn thereon freely. These wheels are provided with a sleeve, a, to make them turn together, and to keep them at a proper distance apart, and may be cast in one piece with said sleeve or be secured to it by any suitable means. The wheel E is provided with a solid clutch-section, D', to correspond with the sliding clutch D on the main shaft, so that when the clutch is closed by the spring b, as shown in Fig. 2, the rotation of the main shaft will rotate the wheels; but when the clutch is opened the wheels are left either stationary or may turn independently of the shaft. The form of clutch shown, having ratchet-teeth, allows the wheels to turn independently of the shaft in one direction; but it may be found preferable for some classes of machinery to use a common forked clutch, or one with teeth having parallel sides, instead of that shown, so as to cause the chains and their wheels to always remain in connection with the main shaft, unless purposely thrown out of gear. The wheels E are provided with endless chains F F, which also pass around and communicate motion to the wheels G G, mounted on a stud, H H, fastened by set-screws or other convenient device in the pivoted hangers I.

Firmly attached to the wheels G G are two other wheels, K, which are connected by endless chains L with the wheels M M, running on studs N, suitably fastened in the pivoted hangers O. The hangers O are provided with a connecting bar or loop, c, so that they may be drawn to one side by the screw d, which passes through the stationary arm e, and is provided with a nut, f, so that the tension of all the chains can be adjusted simultaneously by turning the nut. By this manner of adjusting the tension all the chains are tightened by a single adjusting-screw, and each has the same tension as the others.

To the chains L is secured a cross-bar, P, to which is fastened the rope Q. This rope passes over a fixed pulley, g, arranged at any desired point, and has its lower or outer end connected to any article to which it is to give motion—such as a grain or grading shovel, hoisting bucket or fork, &c.

The operation is as follows: Motion is communicated to the shaft A by a band passing over the pulley C, running from any suitable prime mover; or the shaft may be turned in any other suitable manner, and the chains F F communicate motion through the wheels G G K K to the carrying-chains L, which chains, as they travel in the direction of the arrow, draw up the rope Q, thus drawing the shovel, scoop, or whatever may be at the loose end. As soon as the bar passes the center of the wheels M M the rope begins to descend; and if there is any strain on it, such as would be caused by the weight of a scoop or bucket, the clutch will slip and the rope and the scoop or bucket rapidly descend; or, if a common forked clutch is used, on throwing it open by the lever the same effect will be produced.

For hoisting purposes the clutch device shown is especially advantageous, as the weight of the rope and the hoisting-bucket or other device causes the wheels to turn much faster than the operating-shaft, which need never be stopped or the speed changed until the work is finished, thus giving a slow upward and a fast downward movement to the rope without varying the speed of the prime mover.

The advantage in the use of two chains instead of one consists in the more even movement obtained, as, in the case of a single chain, a constant twist is given to it by the hoisting-rope, which tends to throw the chain off the pulleys and to break and loosen the connections of the link.

Instead of using the cross-bar to connect the rope to the chains, the rope may be made with two branches at its end, which branches can be connected one to each chain; but in this case the pulley $g$ should be located farther from the wheels than now shown in the drawings; and instead of having pivoted hangers the bearings may be arranged to slide longitudinally; but I prefer the arrangement of parts shown in the drawings.

Although I have referred herein to chains and ropes, it is evident that belts may be used, if preferred; and

What I claim as new is—

1. The endless chains L L, passing around and moving with the revolving pulleys K M, in combination with the rope Q, connected to both of the chains L L, substantially as and for the purpose specified.

2. The endless chains L, passing around revolving pulleys K M, and provided with a cross-bar, P, in combination with the pulley $g$, and the rope Q, passing over said pulley, substantially as described.

3. The endless chains L, passing around the pulleys K M, and provided with the cross-bar P, in combination with the pulley $g$, and the rope Q, passing over said pulley, the chains F, the wheels E G, and the clutch D, substantially as described.

4. The wheels E, G, K, and M, and endless chains F and L, in combination with mechanism, substantially as described, for simultaneously adjusting the tension of the chains F and L, as set forth.

5. The wheels E G K M and chains F L, in combination with the fixed hanger D, the pivoted hangers I O, and the adjusting-screw $d$, substantially as described.

In testimony whereof I affix my signature in presence of two witnesses.

JOHN MASLIN.

Witnesses:
WILLIAM D. MASLIN,
JOHN GRIFFIN, Jr.